United States Patent
Yumita (10) Patent No.: US 8,367,257 B2
(45) Date of Patent: Feb. 5, 2013

(54) FUEL CELL SYSTEM AND METHOD FOR ADJUSTING MOISTURE CONTENT IN A POLYMER ELECTROLYTE MEMBRANE

(75) Inventor: Osamu Yumita, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 692 days.

(21) Appl. No.: 12/443,497

(22) PCT Filed: Oct. 17, 2007

(86) PCT No.: PCT/IB2007/003089
§ 371 (c)(1),
(2), (4) Date: Mar. 30, 2009

(87) PCT Pub. No.: WO2008/047211
PCT Pub. Date: Apr. 24, 2008

(65) Prior Publication Data
US 2011/0053014 A1    Mar. 3, 2011

(30) Foreign Application Priority Data
Oct. 18, 2006    (JP) .................................. 2006-283441

(51) Int. Cl.
*H01M 8/04* (2006.01)
(52) U.S. Cl. ....................................... 429/415; 429/432
(58) Field of Classification Search .................. 429/415, 429/432
See application file for complete search history.

(56) References Cited

U.S. PATENT DOCUMENTS

| | | |
|---|---|---|
| 2005/0147863 A1 | 7/2005 | Hiramatsu et al. |
| 2005/0175872 A1 | 8/2005 | Trabold et al. |
| 2006/0083967 A1* | 4/2006 | Sakai ............................... 429/24 |
| 2006/0134474 A1 | 6/2006 | Toth |
| 2008/0032197 A1* | 2/2008 | Horpel et al. ................. 429/224 |
| 2009/0286109 A1* | 11/2009 | Araki ............................... 429/13 |

FOREIGN PATENT DOCUMENTS

| | | |
|---|---|---|
| DE | 10 2004 051 391 | 6/2005 |
| JP | 2002-175821 | 6/2002 |
| JP | 2003-317762 | 11/2003 |
| JP | 2004-127914 | 4/2004 |
| JP | 2006-210004 | 8/2006 |
| WO | WO 2005/088755 A1 | 9/2005 |

OTHER PUBLICATIONS

German Office Action for German Appl. No. 11 2007 002 429.1-45 dated Feb. 25, 2011.
Notification of Reason(s) for Refusal for Japanese Appl. No. 2006-283441 dispatch date: May 22, 2012.

* cited by examiner

*Primary Examiner* — Jennifer K Michener
*Assistant Examiner* — Monique Wills
(74) *Attorney, Agent, or Firm* — Finnegan, Henderson, Farabow, Garrett & Dunner, LLP

(57) ABSTRACT

A fuel cell system (10) that includes with a polymer electrolyte fuel cell (22) having a polymer electrolyte membrane is provided with a determining portion that determines whether a moisture content in the polymer electrolyte membrane is low, and an anode gas pressure regulating portion that sets a gas pressure on an anode side of the fuel cell lower than a set value of the gas pressure on the anode side during steady operation in which the moisture content is not low, when it is determined that the moisture content is low.

5 Claims, 6 Drawing Sheets

FUEL CELL SYSTEM AND METHOD FOR ADJUSTING MOISTURE CONTENT IN A POLYMER ELECTROLYTE MEMBRANE

CROSS-REFERENCE TO RELATED APPLICATIONS

This application is a national phase application of International Application No. PCT/IB2007/003089, filed Oct. 17, 2007, and claims the priority of Japanese Application No. 2006-283441. filed Oct. 18, 2006, the contents of both of which are incorporated herein by reference.

FIELD OF THE INVENTION

The invention relates to a fuel cell system provided with a polymer electrolyte membrane fuel cell, and a method for adjusting the moisture content in a polymer electrolyte membrane of that fuel cell.

BACKGROUND OF THE INVENTION

When the moisture content of an electrolyte membrane in a polymer electrolyte membrane fuel cell decreases, the proton conductivity of the electrolyte membrane also decreases, and as it does so, the membrane resistance increases. As a result, the output voltage decreases, thus reducing battery performance. In order to minimize this kind of problem, Japanese Patent Application Publication No. 2002-175821 (JP-A-2002-175821), for example, proposes a structure that performs control to further increase the gas pressure on the cathode side as a countermeasure for when the moisture content of the electrolyte membrane is low.

In a fuel cell, water is produced at the cathode as a result of an electrochemical reaction so almost all of the moisture content discharged from the fuel cell to the outside is discharged as water vapor together with cathode off-gas. If the gas pressure on the cathode side is increased as described above, the water tends to be present in the cathode side flow path in the form of liquid water rather than water vapor, so the amount that is discharged as water vapor together with the cathode off-gas is able to be suppressed. Further, when increasing the gas pressure on the cathode side, a back pressure valve for adjusting the gas pressure on the cathode side is provided at the outlet portion of the gas flow path on the cathode side. When this back pressure valve is controlled in the close direction such that the opening amount of the valve is reduced, the amount of water vapor discharged from the fuel cell is physically suppressed, which reduces the chances of the electrolyte membrane drying out. Moreover, increasing the gas pressure on the cathode side relative to the anode side promotes the movement of water in the electrolyte membrane from the cathode side, where the water is produced, toward the anode side, thereby ultimately increasing the moisture content in the electrolyte membrane.

However, the gas is usually supplied to the cathode side by supplying pressurized air using a pump or the like. Therefore, increasing the gas pressure on the cathode side results in greater power consumption by the pump or the like, i.e., results in greater loss from the auxiliary device. Hence, when the loss from the auxiliary device increases in this way, the energy efficiency of the entire system that includes the fuel cell decreases.

DISCLOSURE OF THE INVENTION

This invention thus aims to suppress a decline in performance of a fuel cell caused by a decrease in moisture content in an electrolyte membrane without resulting in lower energy efficiency that would otherwise be caused by increased loss from an auxiliary device.

A first aspect of the invention relates to a fuel cell system provided with a fuel cell having a polymer electrolyte membrane. This fuel cell system includes a determining portion that determines whether a moisture content in the polymer electrolyte membrane is low, and an anode gas pressure regulating portion which, when it is determined that the moisture content is low, sets a gas pressure on an anode side of the fuel cell lower than a set value of the gas pressure on the anode side during steady operation at which time the moisture content is not low.

According to the fuel cell system structured as described above, when the moisture content in the electrolyte membrane is low, the anode pressure is reduced such that the electrolyte membrane is replenished with moisture from the cathode as a result of the differential pressure between the anode side and the cathode side. As a result, the resistance value of the electrolyte membrane decreases so a drop in output voltage caused by low moisture content in the electrolyte membrane can be suppressed. Therefore, a decline in performance of the fuel cell can be suppressed even if the moisture content in the electrolyte membrane decreases. Furthermore, the anode pressure can be reduced without increasing energy consumption so a decline in battery performance caused by low moisture content in the electrolyte membrane can be suppressed without reducing energy efficiency.

When it is determined that the moisture content is low, the anode gas pressure regulating portion may set the gas pressure on the anode side lower than the set value during the steady operation but within a range in which power according to a load requirement on the fuel cell can be generated.

According to this kind of structure, a decline in battery performance can be suppressed while power according to the load requirement can be generated even if the moisture content in the electrolyte membrane decreases.

Further, the fuel cell system may also include a hydrogen gas supply passage that supplies hydrogen gas to an anode of the fuel cell, and an anode off-gas passage that leads gas discharged from the anode of the fuel cell to the hydrogen gas supply passage. Also, a portion of the hydrogen gas supply passage and the anode off-gas passage may form a recirculation flow path that recirculates hydrogen between portions inside the fuel cell, and the anode gas pressure regulating portion may set the pressure inside the recirculation flow path as the gas pressure on the anode side.

According to this kind of structure, in a fuel cell system that uses hydrogen gas as the fuel gas, it is possible to suppress a decline in battery performance when the moisture content in the electrolyte membrane is low while efficiently using the hydrogen gas.

This kind of fuel cell system may also include an injector which is provided upstream of the recirculation flow path in the hydrogen gas supply passage and which has a discharge port through which the hydrogen gas is discharged to the recirculation flow path side, and a valve that selectively opens and closes the discharge port. Also, the anode gas pressure regulating portion may set the gas pressure on the anode side by adjusting the open/closed state of the discharge port using the valve.

According to this kind of structure, the gas pressure on the anode side can easily be adjusted to a desired pressure by adjusting the open/closed state of the discharge port using the valve.

The invention can also be realized by various modes other than those described above. For example, the invention can be realized by a mode such as a method for controlling moisture content in a polymer electrolyte membrane of a the polymer electrolyte fuel cell.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EMBODIMENTS

Next, example embodiments of the invention will be described in the following order. A. Overall structure of the apparatus; B. The relationship between anode pressure and membrane resistance; C. Low membrane moisture content control; and D. Modified examples.

A. Overall Structure of the Apparatus

Figure 1:
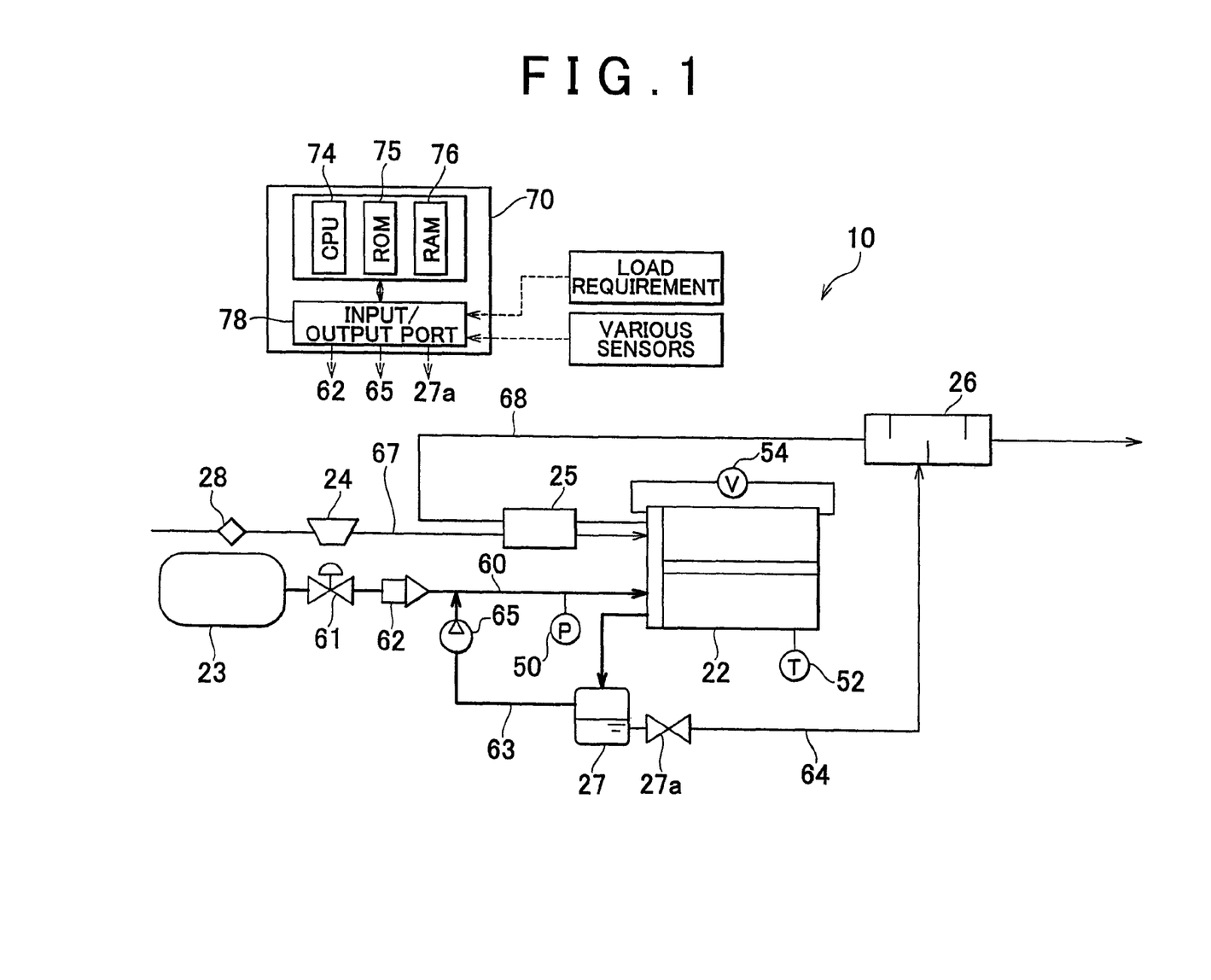
FIG. 1 is a block diagram showing the general structure of a fuel cell system.

FIG. 1 is a block diagram showing the general structure of a fuel cell system 10 as one example embodiment of the invention. The fuel cell system 10 includes a fuel cell 22 which is the main body that generates power, a hydrogen tank 23 that stores hydrogen to be supplied to the fuel cell 22, and an air compressor 24 for supplying compressed air to the fuel cell 22. The fuel cell 22 is a polymer electrolyte membrane fuel cell that has a stacked structure in which a plurality of unit cells are stacked together.

The hydrogen tank 23 is a hydrogen cylinder that stores high pressure hydrogen, for example. Alternatively, a hydrogen-absorbing alloy tank may be used which stores hydrogen by absorbing it in a hydrogen-absorbing alloy provided inside the tank. The hydrogen gas stored in the hydrogen tank 23 is released into a hydrogen supply passage 60 that is connected to the hydrogen tank 23, after which it is adjusted to a predetermined pressure (i.e., reduced in pressure) by a pressure-regulating valve 61 and then supplied as fuel gas via an injector 62 to an anode of each unit cell that makes up the fuel cell 22. Incidentally, the pressure-regulating valve 61 is shown as a single valve in FIG. 1. However, as many pressure-regulating valves as necessary may be provided so that the hydrogen gas to be supplied from the hydrogen tank 23 at a reduced pressure is able to be reduced in pressure to a desired pressure and supplied to the injector 62.

The injector 62 is a device which is provided with a discharge port and a valve, i.e., an electromagnetic valve, that opens and closes the discharge port. The injector 62 injects hydrogen gas according to the differential pressure being applied in front and in back of the injector 62 from the discharge port when the valve is open. Accordingly, the amount of hydrogen gas supplied to the anode side can be adjusted according to the duration for which the valve provided in the injector 62 is open. More specifically, the amount of hydrogen gas injected, i.e., the amount of hydrogen gas supplied to the anode, can be adjusted by adjusting the pulse width of a drive signal received by the injector 62 at a constant cycle, i.e., by adjusting the duty ratio when the valve is opened and closed.

Anode off-gas that is discharged from the anode of the fuel cell 22 is led to an anode off-gas passage 63 and again flows into the hydrogen supply passage 60 at a location downstream of the position where the injector 62 is arranged. In this way, any residual hydrogen in the anode off-gas is recirculated in a flow path which is formed by a portion of the hydrogen supply passage 60, the anode off-gas passage 63, and a flow path within the fuel cell 22 (hereinafter, the flow path which is formed will be referred to as the "recirculation flow path"), and provided for the electrochemical reaction again. At this time, hydrogen of an amount corresponding to the amount consumed by the electrochemical reaction is added into the recirculation flow path from the hydrogen tank 23 via the injector 62. That is, the duty ratio of the injector 62 is adjusted according to the amount of hydrogen consumed (i.e., according to the amount of power generated or the load requirement). In addition, the duty ratio of the injector 62 is feedback controlled based on the gas pressure inside the recirculation flow path (hereinafter referred to as the "anode pressure"). The anode pressure is maintained at a predetermined substantially constant value. In this example embodiment, an anode pressure sensor 50 that detects the anode pressure is provided in the hydrogen supply passage 60 that forms part of the recirculation flow path. Also, a hydrogen pump 65 is provided in the anode off-gas passage 63 to recirculate the anode off-gas in the recirculation flow path.

Figure 2:
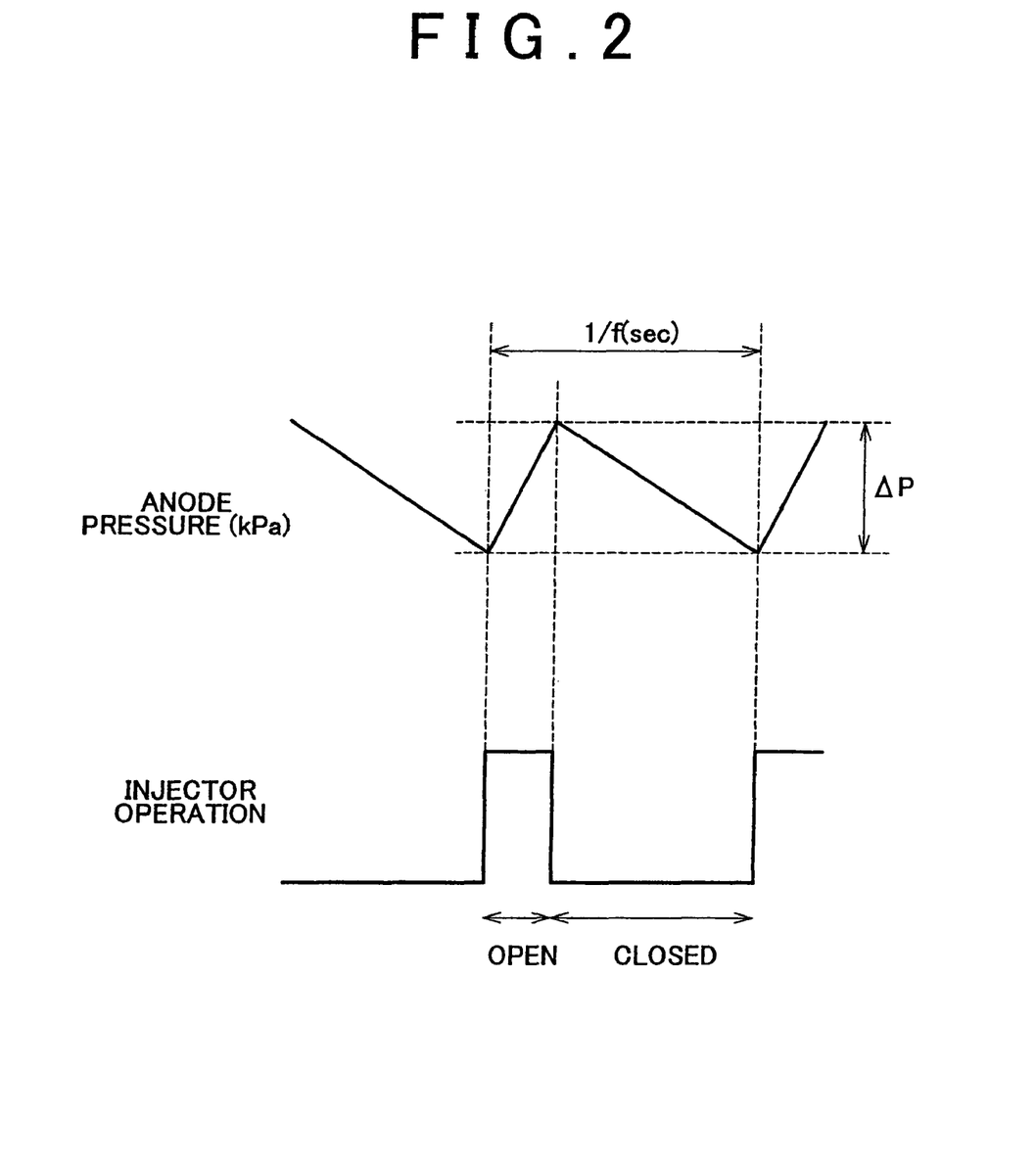
FIG. 2 is a graph showing the relationship between anode pressure and the operation of an injector.

FIG. 2 is a graph showing the relationship between the anode pressure and the operation of the injector 62. The valve of the injector 62 is controlled to open and closed by changing the pulse width at a constant frequency f of the drive signal that opens and closes the valve, for example. As shown in FIG. 2, the anode pressure increases when the valve is in a position that opens the discharge port, and decreases due to hydrogen in the recirculation flow path being consumed to generate power when the valve is in a position that closes the discharge port. Therefore, opening and closing the valve makes the anode pressure pulse within a range of the pressure difference of ΔP shown in FIG. 2. The anode pressure can on the whole be maintained at a desired pressure while pulsing every so slightly by controlling the duty ratio of the injector 62.

When the fuel cell 22 is operating steadily, the anode pressure of the fuel cell system 10 of this example embodiment is set to a value that can ensure that enough hydrogen can be supplied even if the load requirement on the fuel cell 22 fluctuates such that the maximum amount of hydrogen is consumed, and which takes into consideration the balance with the gas pressure on the cathode side. Here, while the fuel cell 22 is operating steadily, the temperature of the fuel cell 22 is sufficiently high, the moisture content in the electrolyte membrane is sufficient, and the necessary power for the load requirement can be generated by the fuel cell 22 without any problem.

Furthermore, a gas-liquid separator 27 is provided in the anode off-gas passage 63. As the electrochemical reaction progresses, water is produced at the cathode. Some of this water moves to the anode side via the electrolyte membrane of the fuel cell 22 and vaporizes in the fuel gas. The gas-liquid separator 27 is an apparatus that condenses the water vapor in the anode off-gas, thus removing it from the anode off-gas.

A valve 27a is provided in the gas-liquid separator 27. By opening this valve 27a, the condensed water in the gas-liquid separator 27 is discharged to the outside via an off-gas discharge passage 64 that is connected to the valve 27a. Incidentally, when the valve 27a is open, some of the anode off-gas that flows through the anode off-gas passage 63 is also discharged to the outside. In this way, opening the valve 27a at a predetermined timing results in some of the hydrogen-containing gas that is recirculated being discharged to the outside, thus suppressing an increase in the impurity concentration in the hydrogen-containing gas (i.e., the concentration of nitrogen and the like in the air that serves as the oxidizing gas, which has moved through the electrolyte membrane to the anode side).

Here, the off-gas discharge passage 64 is connected to a dilution tank 26 which is a container with a larger sectional area than the off-gas discharge passage 64. This dilution tank 26 is provided to dilute the hydrogen in the anode off-gas with cathode off-gas before the anode off-gas is discharged to the outside.

An air compressor 24 pressurizes air drawn in from the outside via an air cleaner 28, and supplies this pressurized air to the cathode of the fuel cell 22 as oxidizing gas via an oxidizing gas supply passage 67. The cathode off-gas that is discharged from the cathode is led by a cathode off-gas passage 68 to be discharged to the outside. Here, the oxidizing gas supply passage 67 and the cathode off-gas passage 68 both pass through a humidifying module 25. In the humidifying module, the oxidizing gas supply passage 67 and the cathode off-gas passage 68 are separated by a water vapor permeable membrane, and the pressurized air that is supplied to the cathode is humidified using the cathode off-gas containing water vapor. Also, the cathode off-gas passage 68 passes through the dilution tank 26 described above before leading the cathode off-gas to the outside. In the dilution tank 26, the cathode off-gas mixes with the anode off-gas that flows in through the off-gas discharge passage 64, dilutes it, and is then discharged to the outside.

Inside the fuel cell 22 is also provided a refrigerant flow path, not shown, through which refrigerant circulates. The internal temperature of the fuel cell 22 is able to be kept within a predetermined temperature range by circulating the refrigerant between the refrigerant flow path formed in the fuel cell 22 and a radiator, not shown. Here, a temperature sensor 52 that detects the temperature of the refrigerant at a refrigerant outlet (hereinafter referred to as the "refrigerant outlet temperature") is provided near a portion where the refrigerant flow path exits the fuel cell 22. This temperature sensor serves as a temperature sensor for detecting the temperature inside the fuel cell 22. Incidentally, a sensor other than one which detects the refrigerant outlet temperature, such as a thermocouple that directly detects the temperature of the fuel cell 22, may instead be provided to detect the internal temperature of the fuel cell. Also, a voltage sensor 54 for detecting an output voltage from the fuel cell 22 is provided in the fuel cell system 10.

Moreover, the fuel cell system 10 includes a control portion 70 that controls the operation of each portion of the fuel cell system 10. This control portion 70 is structured as a theoretical circuit which is centered around a microcomputer. More specifically, the control portion 70 includes, for example, a CPU 74 that executes predetermined calculations and the like according to preset control programs, ROM 75 in which control programs and control data and the like necessary for the CPU 74 to carry out various computing and processing have been stored in advance, RAM 76 into which various data necessary for the CPU 74 to carry out various computing and processing are temporarily written, and an input/output port 78 that inputs and outputs various signals. This control portion 70 obtains, for example, detection signals from various sensors (such as the anode pressure sensor 50, the temperature sensor 52, and the voltage sensor 54) provided in the fuel cell system 10, and information related to the load requirement with respect to the fuel cell 22, and the like. The control portion 70 also outputs drive signals to various portions related to power generation by the fuel cell 22, such as the injector 62, the air compressor 24, the hydrogen pump 65, and the valve 27a and the like provided in the fuel cell system 10.

B. The Relationship Between Anode Pressure and Membrane Resistance

When the moisture content in the polymer electrolyte membrane is low, the fuel cell system 10 of this example embodiment performs control that sets the anode pressure to a value that is different than the value to which it is set during steady operation in order to suppress a decline in battery performance due to the low moisture content. Before describing this kind of control in the fuel cell system 10 of this example embodiment, the relationship between the internal resistance of the fuel cell (i.e., the cell resistance) and the anode pressure will be described below.

Figure 3:
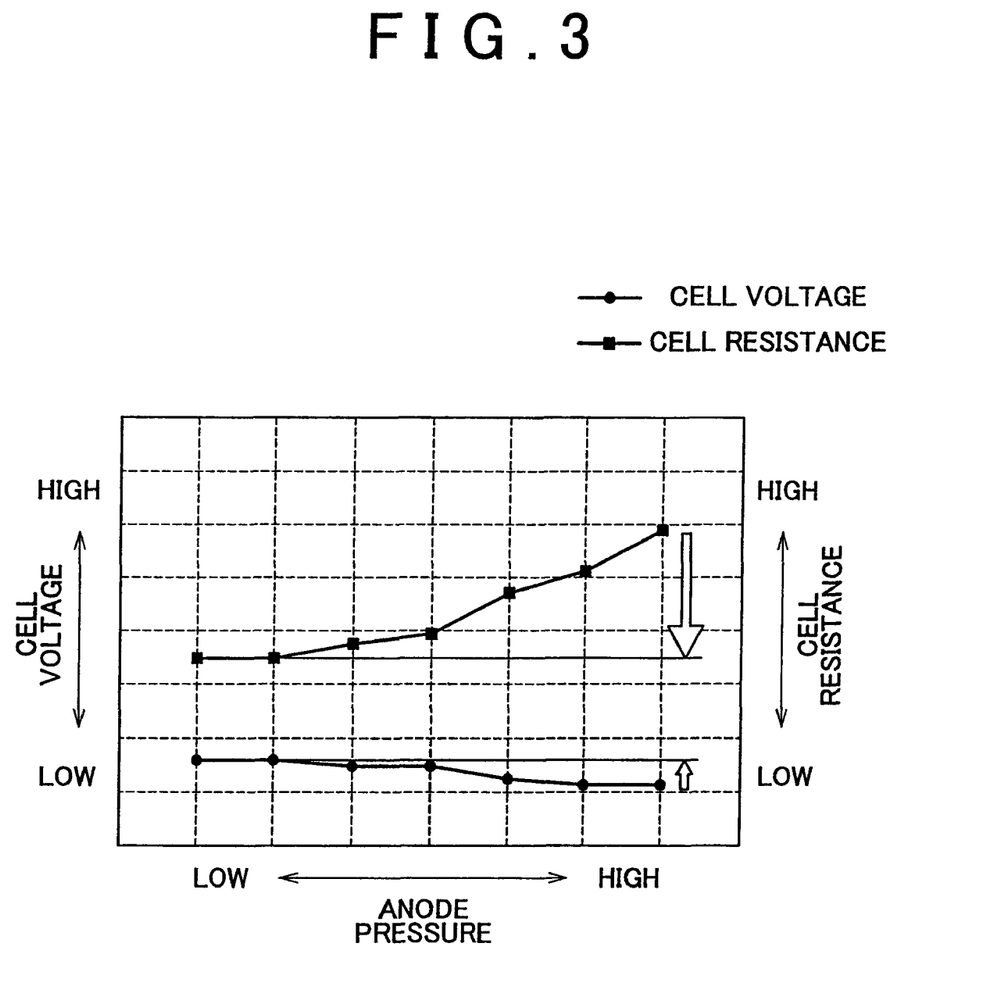
FIG. 3 is a chart showing results obtained after researching the relationship between the anode pressure and cell resistance.

FIG. 3 is a chart showing results that were obtained after researching the relationship between the anode pressure, the cell resistance, and the cell voltage. Here, a unit cell was used as the fuel cell and hydrogen gas which serves as the fuel gas was not circulated. Also, the pressure of the hydrogen gas supplied to the anode side (i.e., the anode pressure) was gradually changed while the unit cell was connected to a constant load, i.e., while the output current value was maintained at a constant value, and the cell resistance and cell voltage were measured. Also, air was used as the oxidizing gas supplied to the cathode. The pressure of the air flowing through the oxidizing gas flow path in the unit cell, i.e., the cathode pressure, was constant. Also, a refrigerant flow path through which pressurized water, which served as the refrigerant, was provided in the unit cell and the temperature inside the unit cell was kept substantially constant by adjusting the refrigerant outlet temperature. Also, the condition for humidifying the fuel gas and the oxidizing gas was that the moisture content of the electrolyte membrane be low when the anode pressure is set to a pressure that balances the cathode pressure.

Here, the internal resistance of the fuel cell includes resistance caused by contact resistance between the constituent elements of the fuel cell and resistance inherent in each constituent element of the fuel cell. Although it is difficult to detect these discrete resistances, of the two, the resistance of the electrolyte membrane (i.e., the membrane resistance), the value of which fluctuates in response to a change in the moisture content, can change greatly according to a power generating condition of the fuel cell while the fuel cell is generating power. The value of this membrane resistance increases when the moisture content of the electrolyte membrane decreases and the proton conductivity of the electrolyte membrane drops. Therefore, in the results shown in FIG. 3, the increase in the membrane resistance that is caused by the decrease in the moisture content in the electrolyte membrane is detected as an increase in the internal resistance of the fuel cell 22.

The cell resistance which is the internal resistance of the fuel cell is obtained according to the alternating-current (AC)

impedance method. That is, a small AC constant current of a relatively high frequency (such as 10 kHz) is applied to the unit cell. The AC component caused by the AC current is separated from the output voltage using a filter (condenser), and the AC impedance which is the voltage value of the AC component is obtained as the cell resistance.

As shown in FIG. 3, the cell resistance in the unit cell decreases and the cell pressure increases as the anode pressure is reduced.

This decrease in the cell resistance that is brought about by reducing the anode pressure is thought to be due to an increase in the differential pressure between the anode pressure and the cathode pressure which is caused by the anode pressure being reduced so that it is much lower than the cathode pressure. That is, the increase in the differential pressure between the anode pressure and the cathode pressure promotes a shift of the water in the electrolyte membrane from the cathode side where the water is generated to the anode side, which ultimately increases the moisture content in the electrolyte membrane. This is thought to reduce the membrane resistance.

As described above, from the results shown in FIG. 3, we know that reducing the anode pressure can lower the cell resistance and increase the cell voltage when the moisture content in the electrolyte membrane is low. In particular, when operating the fuel cell using hydrogen gas as the fuel gas, the anode pressure is set taking into account the balance with the gas pressure on the cathode side to which air of a relatively low oxygen concentration is supplied. Therefore, the anode pressure is quite excessive compared to the value necessary to obtain the desired power. Reducing the anode pressure within a range sufficient to generate power according to the load requirement enables the cell resistance to be reduced and the cell voltage to be increased while obtaining the desired power when operating the fuel cell with excessive anode pressure in this way. Using this knowledge, battery performance in the fuel cell system 10 of this example embodiment can be maintained by performing control to reduce the anode pressure when the moisture content in the electrolyte membrane is low.

C. Low Membrane Moisture Content Control

Figure 4:
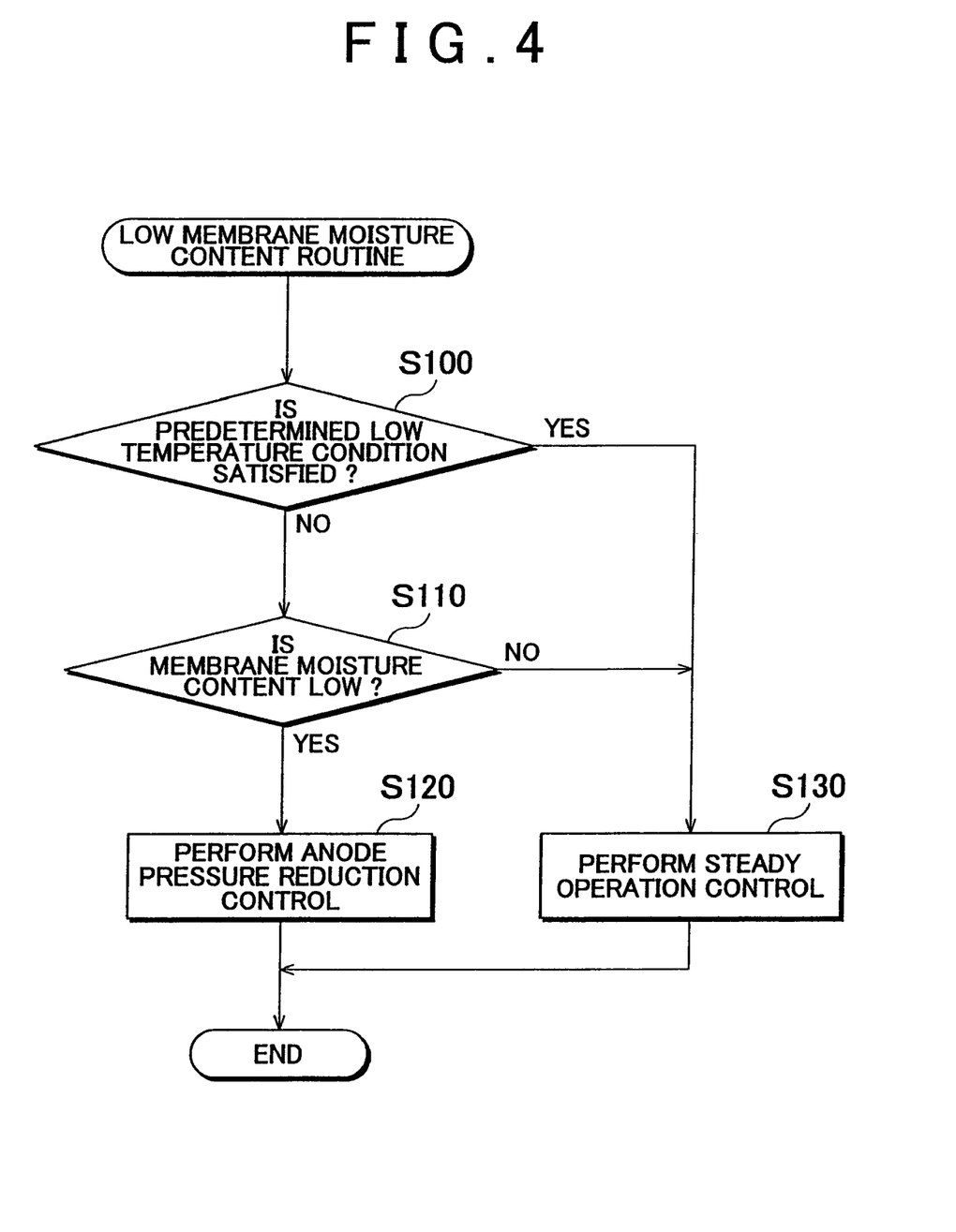
FIG. 4 is a flowchart illustrating a low membrane moisture content routine.

FIG. 4 is a flowchart illustrating a low membrane moisture content routine, i.e., a routine to be executed when the moisture content in the membrane is low, that is executed in the CPU 74 of the control portion 70 provided in the fuel cell system 10. This routine is executed repeatedly at predetermined intervals while power is being generated by the fuel cell 22.

When the routine starts, the CPU 74 first determines whether the fuel cell 22 satisfies a predetermined low temperature condition (step S100). The determination as to whether the fuel cell 22 satisfies the predetermined low temperature condition in step S100 may be made based on whether the gas flow may be impeded by liquid water that is produced in the fuel cell by a drop in the internal temperature of the fuel cell (so-called flooding). In this example embodiment, it is determined that the fuel cell 22 satisfies the predetermined low temperature condition when the internal temperature is 80° C. or less using the temperature detected by the temperature sensor 52 as the internal temperature of the fuel cell 22.

Figure 5:
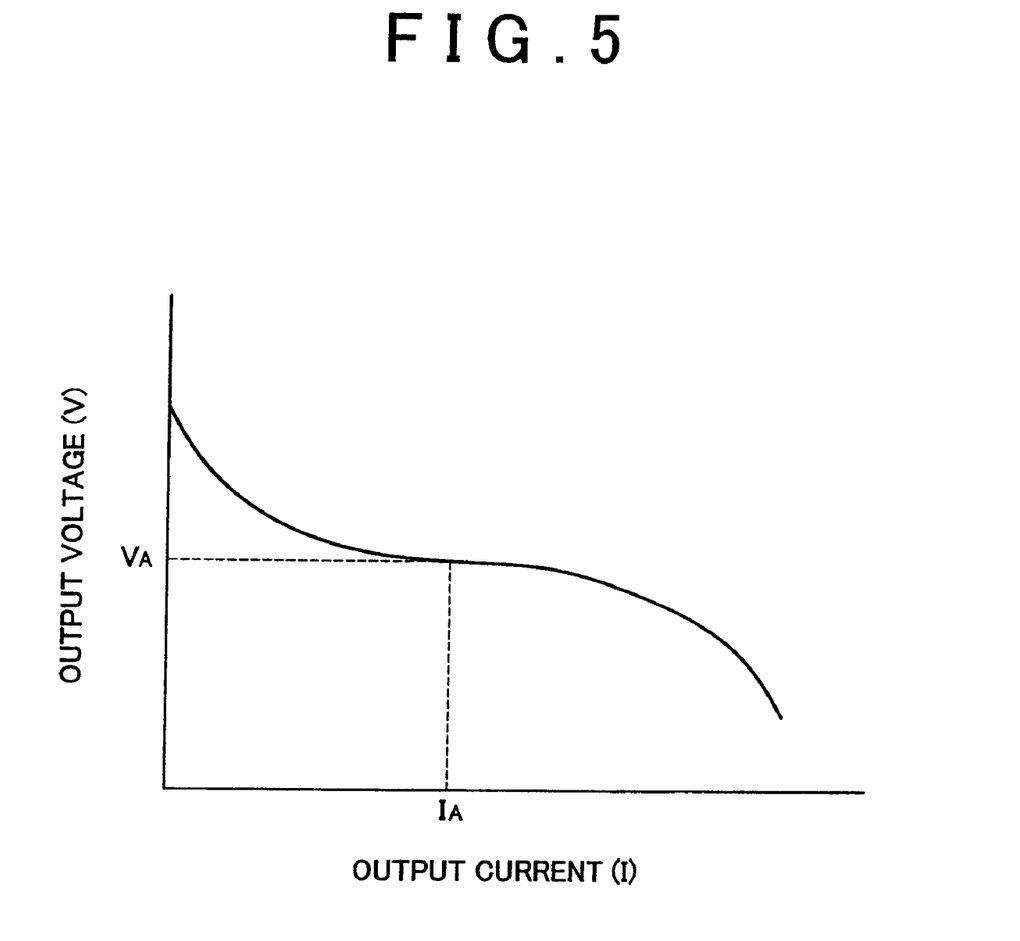
FIG. 5 is a graph showing one example of an output current-to-output voltage characteristic (output characteristic)

If it is determined in step S100 that the predetermined low temperature condition is not satisfied, the CPU 74 then determines whether the moisture content in the electrolyte membrane is low based on the output voltage of the fuel cell 22 (step S110). More specifically, an output voltage value of the fuel cell 22 that was detected by the voltage sensor 54 is obtained, and an output current value of the fuel cell 22 that was detected by a current sensor, not shown, is also obtained. Typically, in a fuel cell that is operating steadily, the output voltage value is primarily determined according to the output current value. There is a consistent relationship between the output current value and the output voltage value. FIG. 5 is a graph showing one example of such an output current-to-output voltage characteristic (output characteristic). The control portion 70 in the example embodiment stores the output characteristic when the fuel cell 22 is operating steadily. In step S110, the CPU 74 obtains a reference voltage value ($V_A$), which is a reference value of the output voltage value during steady operation, based on the obtained output current ($I_A$) and the stored output characteristic. Then the detection value of the output voltage value that was obtained from the voltage sensor 54 is compared with this obtained reference voltage value. When the value that was actually detected is less than the reference voltage value by a predetermined percentage or more, it is determined that the moisture content in the electrolyte membrane is low.

Here, step S100 is a step that is performed in order to prevent the moisture content in the electrolyte membrane from being determined in step S110 as being low despite the fact that conditions are such that it is not possible for the moisture content in the electrolyte membrane to be low. In step S110 of this example embodiment, the determination as to whether the moisture content in the electrolyte membrane is low is made based on the output voltage of the fuel cell 22. This uses the property in which the resistance value of the electrolyte membrane increases and the output voltage of the fuel cell decreases when the moisture content of the electrolyte membrane is low. However, a drop in output voltage can be seen not only when the moisture content in the electrolyte membrane is low, but also when flooding occurs. Therefore, in this example embodiment, a case in which the fuel cell 22 satisfies the low temperature condition under which flooding can occur is eliminated in step S100 before step S110 in order to prevent it from being determined that the moisture content in the electrolyte membrane is low despite the fact that flooding is actually occurring, when the output voltage is low. In this way, when executing steps S100 and S110, the CPU 74 of the control portion 70 functions as a low moisture content determining portion that determines whether the moisture content in the electrolyte membrane is low.

If it is determined in step S110 that the moisture content in the electrolyte membrane is low, the CPU 74 performs control to lower the set value of the anode pressure (step S120), after which this cycle of the routine ends. As described above, when the fuel cell 22 is operating steadily, the anode pressure is set to a constant value that can ensure that enough hydrogen can be supplied even if the load requirement on the fuel cell 22 fluctuates such that the maximum amount of hydrogen is consumed, and which takes into consideration the balance with the gas pressure on the cathode side. In step S120, the CPU 74 performs control to set the anode pressure to a value which is sufficient for generating power according to the load requirement and which is lower than the value to which it is set (i.e., the set value) during steady operation. Mote specifically, the control to set the anode pressure even lower is performed by adjusting the duty ratio of the injector 62 so that the detection value from the anode pressure sensor 50 becomes a predetermined value that is lower than the value during steady operation by outputting a drive signal from the control portion 70 to the injector 62. When step S120 is executed in this way, the CPU 74 functions as an anode gas pressure regulating portion that sets the anode pressure lower than the anode pressure during steady operation.

Incidentally, when it is determined in step S100 that the fuel cell 22 satisfies the predetermined low temperature condition, the saturated vapor pressure in the gas flow path in the fuel cell is low and the moisture is inhibited from vaporizing from the electrolyte membrane to the fuel gas and the oxidizing gas. Thus, it is thought to be extremely unlikely that the electrolyte membrane would have a low moisture content at that time. Therefore, the process proceeds on to step S130 where the CPU 74 controls the anode pressure according to the control that is executed when the fuel cell 22 is operating steadily (i.e., steady operation control), after which this cycle of the routine ends. Similarly, when it is determined in step S110 that the moisture content in the electrolyte membrane is not low, the process also proceeds to step S130 where the CPU 74 performs the steady operation control, after which this cycle of the routine ends. In this way, by repeatedly executing the low membrane moisture content routine shown in FIG. 4, control is performed to reduce the anode pressure when the membrane moisture content is low, and normal control is resumed again when the membrane moisture content is restored after the control to reduce the anode pressure starts.

According to the fuel cell system 10 structured as described above, when the moisture content in the electrolyte membrane is low, the anode pressure is reduced which lowers the resistance value of the electrolyte membrane and thus enables a drop in output voltage, which is caused by low moisture content in the electrolyte membrane, to be suppressed. Therefore, even if the moisture content in the electrolyte membrane is low, it is still possible to keep generating the desired power while maintaining sufficient output voltage, and thus suppress a decline in performance of the fuel cell 22. Furthermore, the anode pressure can be reduced without increasing energy consumption so a decline in battery performance caused by low moisture content in the electrolyte membrane can be suppressed without reducing energy efficiency.

In particular, the fuel cell system 10 of this example embodiment is a structure which is provided with a recirculation flow path that serves as the gas flow path on the anode side, and circulates hydrogen gas of a high pressure so as to balance the gas pressure of the oxidizing gas through the recirculation flow path. Therefore, it is possible to easily reduce the anode pressure in a range sufficient for generating power according to the load requirement.

Also, in this example embodiment, the anode pressure is adjusted by the duty ratio when the valve opens and closes the discharge port of the injector 62. Therefore, the anode pressure can easily be controlled to the desired value by the simple operation of controlling the valve open and closed. Incidentally, in order to adjust the anode pressure, the open/closed state of the discharge port may be adjusted by the valve according to a method other than the method of changing the duration for which the valve is open and the duration for which the valve is closed as is the case when adjusting the duty ratio. For example, the anode pressure may also be adjusted by adjusting the opening amount of the valve.

Further, when determining in step S110 whether the moisture content is low based on the output voltage value, hysteresis is preferably provided in the reference value of the output voltage value. That is, the determination in step S110 is made differently depending on the circumstance. In a first case, it is determined whether the moisture content became low when steady operation control is being performed. In a second case, it is determined whether the moisture content has recovered, i.e., is no longer low, while the anode pressure reduction control is being performed. At this time, it is preferable that the reference voltage value used in the first case be set lower than the reference voltage value used in the second case so that chattering can be prevented and the stability of the switching operation of the control related to the anode pressure can be improved.

Also, instead of changing the set value of the anode pressure to a single value that is less than the anode pressure that is set during steady operation, the anode pressure reduction control may be structured differently. That is, if the output voltage value does not sufficiently recover even though the anode pressure reduction control is performed in step S120, the set value of the anode pressure may be changed to an even lower value in step S120 the next time the low membrane moisture content routine is executed. As shown in FIG. 2, the voltage recovery effect can be increased as the anode pressure is reduced even further. At this time, a decline in battery performance can be suppressed without inhibiting output power with respect to the load requirement as long as the value of the anode pressure that was set even lower is within a range in which the desired power can be obtained even if the load requirement fluctuates.

D. Modified Examples

The invention is not limited to details of the illustrated embodiments, but may be embodied with various changes, modifications or improvements without departing from the spirit and scope of the invention. For example, the following modified examples are also possible.

D1. First Modified Example

In the foregoing example embodiment, the determination with respect to the moisture content in the electrolyte membrane in step S110 in FIG. 4 is made based on the output voltage value of the fuel cell 22 after excluding a case in which flooding can occur in step S100 in FIG. 4. Alternatively, however, that determination may also be made on a different basis.

For example, instead of steps S100 and S110, the determination as to whether the moisture content in the electrolyte membrane is low may be made based on the internal temperature of the fuel cell 22. In step S100, it is determined that the fuel cell 22 is in a predetermined low temperature state when the internal temperature of the fuel cell 22 is 80° C. or less so that flooding can be eliminated. In contrast, it may be determined that the moisture content in the electrolyte membrane is low when the internal temperature of the fuel cell 22 is a temperature at which it is conceivable that the moisture content in the electrolyte membrane would become low by the increased saturated vapor pressure, such as 90° C. or above. With this kind of structure, it is possible to easily determine whether the moisture content in the electrolyte membrane is low using the simple method of detecting a temperature, such as the refrigerant temperature, that reflects the internal temperature of the fuel cell 22.

D2. Second Modified Example

Alternatively, instead of steps S100 and S110, the determination as to whether the moisture content in the electrolyte membrane is low may be made based on the membrane resistance of the electrolyte membrane. As described above, when the membrane moisture content drops the membrane resistance of the electrolyte membrane increases. Therefore, when the membrane resistance increases to a predetermined value or beyond it can be determined that the moisture content is low. However, detecting the membrane resistance itself is difficult. Of the internal resistance of the fuel cell 22, the membrane resistance greatly changes depending on the power generating condition. Therefore, the determination may be made by obtaining the internal resistance of the fuel cell 22. The internal resistance of the fuel cell 22 may be obtained by the AC impedance method described above, for example. When the value of the AC impedance is equal to or greater than a predetermined reference value, it can be determined that the moisture content in the electrolyte membrane is low. According to this kind of structure, it is possible to accurately determine whether the moisture content in the electrolyte membrane is low based on the membrane resistance.

D3. Third Modified Example

It is also possible to determine whether the moisture content in the electrolyte membrane is low based on a drop in the pressure of the oxidizing gas supplied to the cathode (i.e., a cathode pressure drop). That is, a pressure sensor that detects the pressure of the oxidizing gas is provided in both the oxidizing gas supply passage 67 and the cathode off-gas passage 68, and the cathode pressure drop, which is the difference between the two detection values, is obtained. When the obtained cathode pressure drop is less than a predetermined value, it can be determined that the moisture content in the electrolyte membrane is low. This is because when the membrane moisture content is low there is not much liquid water in the oxidizing gas flow path so the oxidizing gas flow is not impeded as much by the liquid water, hence the pressure drop decreases.

More specifically, a gas flowmeter may also be provided in the oxidizing gas supply passage 67 of the fuel cell system 10. Also, the cathode pressure drop, which is used as the reference for determining whether the membrane moisture content is low, may be set in advance for each oxidizing gas flowrate by measuring the cathode pressure drop according to the flowrate of the oxidizing gas in advance while changing the humidity of the gas supplied to the fuel cell, and that cathode pressure drop may be stored in the control portion 70 as a map. By detecting the flowrate of the oxidizing gas using the gas flowmeter and referencing the map, a reference value of the cathode pressure drop of that oxidizing gas flowrate may be obtained, and this obtained reference value of the pressure drop may then be compared with the cathode pressure drop obtained from the detection value from the pressure sensor. When the detected cathode pressure drop is equal to or less than the reference value of the pressure drop obtained from the gas flowrate, it can be determined that the moisture content in the electrolyte membrane is low. Incidentally, the gas flowrate of the oxidizing gas may not only be directly detected by providing a flowrate sensor, but also be estimated using an estimated value. The oxidizing gas flowrate can be estimated based on, for example, the pressure and temperature of the air drawn into the air compressor 24 as the oxidizing gas and the speed of the air compressor 24. According to this kind of structure, it is possible to determine whether the moisture content in the electrolyte membrane is low according to a simple method without having to detect the membrane resistance directly.

D4. Fourth Modified Example

Similarly, the determination as to whether the moisture content in the electrolyte membrane is low may be made based on a drop in pressure of the fuel gas supplied to the anode (i.e., an anode pressure drop). That is, a pressure sensor that detects the pressure of the fuel gas is provided in both the hydrogen supply passage 60 and the anode off-gas passage 68, and the anode pressure drop, which is the difference between the two detection values, is obtained. When the obtained anode pressure drop is less than a predetermined value, it can be determined that the moisture content in the electrolyte membrane is low. Here, the anode pressure drop becomes a value that is not only affected by the amount of liquid water in the fuel gas flow passage, but which also relies on the amount of hydrogen consumed by the generation of power. The amount of hydrogen consumed by the generation of power can be calculated based on an integrated value of an output current that is detected by an ammeter which is provided to detect the output current of the fuel cell 22. In the control portion 70 of the fuel cell system 10, the anode pressure drop, which serves as the reference for determining whether the membrane moisture content is low, may be set in advance by measuring the anode pressure drop according to the integrated value of the output current (i.e., the amount of hydrogen consumed) in advance while changing the humidity of the gas supplied to the fuel cell, and that anode pressure drop may be stored beforehand as a map. A reference value of the anode pressure drop is obtained based on the integrated value of the output current detected using the ammeter, and the map. This reference value of the pressure drop is then compared with the detection value of the anode pressure drop from the pressure sensor. When the detected anode pressure drop is equal to or less than the reference value, it can be determined that the moisture content in the electrolyte membrane is low. In this kind of case as well, it is possible to determine whether the moisture content in the electrolyte membrane is low by a simple method without having to detect the membrane resistance directly.

D5. Fifth Modified Example

Alternatively, the determination as to whether the moisture content in the electrolyte membrane is low may be made by calculating the amount of humidity in the oxidizing gas supplied to the fuel cell 22, the amount of water produced in the fuel cell as a result of generating power, and the amount of water vapor in the off-gas (i.e., the drainage volume), and computing the water balance in the fuel cell 22.

The oxidizing gas is humidified in the humidifying module 25 described above using the cathode off-gas. The humidifying efficiency of this humidifying module 25 is a value that is set according to the pressure and temperature of the oxidizing gas that is to be humidified or the pressure and humidity of the cathode off-gas that is used to humidify. Therefore, the humidification amount of the oxidizing gas can be obtained beforehand according to parameters such as the pressure and temperature of the oxidizing gas that is to be humidified or the pressure and humidity of the cathode off-gas that is used to humidify, and stored in the control portion 70 as a map. Accordingly, the humidification amount of the oxidizing gas can be obtained by detecting the parameters using sensors and referencing the map.

The amount of water produced as a result of generating power can be theoretically calculated according to the amount of power generated. Therefore, an ammeter that detects the output current from the fuel cell 22 may be provided in the fuel cell system 10 and the amount of water produced may be calculated based on the detection value from this ammeter.

A gas flowrate sensor, a gas temperature sensor, and a gas pressure sensor can be provided in the cathode off-gas passage 68, and the amount of water vapor in the cathode off-gas can be calculated by detecting the flowrate, temperature, and pressure of the cathode off-gas. In this case, the vapor pressure in the cathode off-gas is calculated as the saturated vapor pressure. Incidentally, the amount of moisture discharged from the valve 27a of the gas-liquid separator 27 does not change much when the moisture content in the electrolyte membrane changes and is therefore ignored when calculating the drainage volume. Alternatively, however, the drainage volume may be calculated taking the amount of moisture into account.

In this way, it is possible to determine that the moisture content in the electrolyte membrane is low when Expression (1) below is true when the oxidizing gas humidification amount, the amount of water produced, and the drainage volume are calculated.

$$(\text{drainage volume}) > (\text{humidification amount} + \text{amount of water produced}) \times C \quad (1)$$

Incidentally, the constant C is a value that represents the performance of the fuel cell in terms of whether the fuel cell can generate power regardless of how much the moisture content of the membrane drops, and can be set for each fuel cell. This constant C can be set as a value greater than 1. According to Expression (1), when the constant C is greater than 1, the amount of moisture in the fuel cell gradually decreases so the moisture content in the electrolyte membrane continues to drop. In reality, however, this does not happen because the vapor pressure in the cathode off-gas is calculated as the saturated vapor pressure when the drainage volume is calculated. When the temperature of the fuel cell is somewhat low, the vapor pressure in the cathode off-gas will reach the saturated vapor pressure. However, when the temperature of the fuel cell is high enough so that the moisture content in the electrolyte membrane will drop, the vapor pressure of the cathode off-gas will not reach the saturated vapor pressure. Therefore, the actual drainage volume will be less than the drainage volume that was calculated as described above so the constant C in Expression (1) is set to a value greater than 1. According to this kind of structure, it is possible to easily determine whether the moisture content in the electrolyte membrane is low using a detection value from an ammeter, which is a sensor that is normally provided to control the fuel cell system, or a flowrate sensor, a temperature sensor, and a pressure sensor or the like for the cathode off-gas, without having to detect the membrane resistance directly.

D6. Sixth Modified Example

The determination as to whether the moisture content in the electrolyte membrane is low may also be made based on the humidity of the off-gas (either the cathode off-gas or the anode off-gas). For example, when the humidity of the cathode off-gas is to be used, a gas dew point meter and a gas temperature sensor may be provided in the cathode off-gas passage 68 and the humidity of the cathode off-gas may be obtained. When the temperature of the fuel cell is relatively low; the water vapor pressure of the off-gas reaches the saturated vapor pressure. However, when the temperature of the fuel cell rises such that the moisture content in the electrolyte membrane may become low, the humidity in the off-gas drops below the humidity corresponding to the saturated vapor pressure. Therefore, the off-gas humidity, which is used as the reference for determining whether the moisture content is low, is set in advance. When the off-gas humidity obtained based on the detection value falls below the off-gas humidity used as the reference, it can be determined that the moisture content in the electrolyte membrane is low. In this kind of case as well, it is possible to determine whether the moisture content in the electrolyte membrane is low using a simple method without having to directly detect the membrane resistance.

D7. Seventh Modified Example

In the example embodiment, the injector 62 is used to replenish the hydrogen gas in the recirculation flow path. Alternatively, however, a different structure may be used. For example, a pressure-reducing valve may be provided instead of the injector 62 and control may be performed to reduce the anode pressure by adjusting the pressure of the fuel gas supplied to the fuel cell 22 using this pressure-reducing valve.

Figure 6:
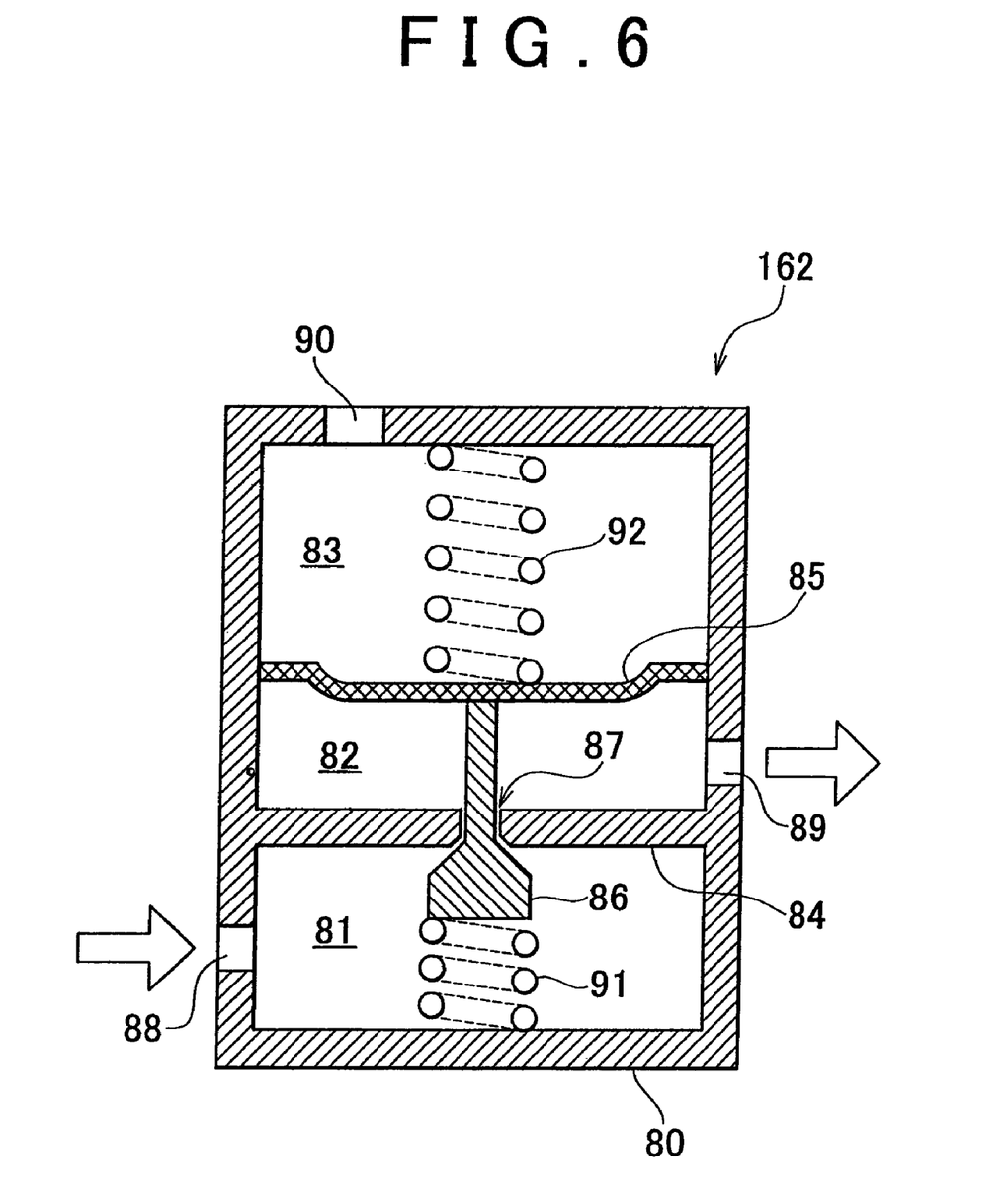
FIG. 6 is a sectional view showing a frame format of the general structure of a pressure-reducing valve.

FIG. 6 is a sectional view showing a frame format of the general structure of a pressure-reducing valve 162 given as one example of the pressure-reducing valve that is used instead of the injector 62. The pressure-reducing valve 162 includes a housing 80, a diaphragm 85, a poppet 86, and springs 91 and 92. In the housing 80 are formed a primary side inlet 88 in through which flows hydrogen gas that is supplied from the hydrogen tank 23 side, a secondary side outlet 89 out through which hydrogen gas is discharged to the recirculation flow path side, and a back-pressure port 90 that opens to ambient air. The diaphragm 85 divides the inner portion of the housing 80 into an upper space and a lower space in the drawing. The upper space constitutes a pressure-regulating chamber 83 that is open to ambient air via the back-pressure port 90. The lower space is further divided into two more spaces, one being a primary side gas chamber 81 and the other being a secondary side gas chamber 82, by a dividing plate 84 of the housing 80.

A regulating hole 87 which provides communication between the primary side gas chamber 81 and the secondary side gas chamber 82 is formed in the dividing plate 84. The opening amount of this regulating hole 87 is adjusted by the poppet 86 which is connected to the diaphragm 85. The high pressure hydrogen gas that flowed into the primary side gas chamber 81 from the primary side inlet 88 passes through the regulating hole 87, which reduces the pressure of the hydrogen gas, and into the secondary side gas chamber 82 from where it is supplied to the recirculation flow path via the secondary side outlet 89.

The spring 91 is arranged in the primary side gas chamber 81 and urges the poppet 86 in a direction that reduces the opening amount of the regulating hole 87. Also, the spring 92 is arranged in the pressure-regulating chamber 83 and urges the diaphragm 85 in a direction that increases the opening amount of the regulating hole 87. Moreover, the pressure of the pressure-reduced hydrogen gas in the second side gas chamber 82 applies force to the diaphragm 85 in a direction that reduces the opening amount of the regulating hole 87, and the pressure of the ambient air inside the pressure-regulating chamber 83 applies force to the diaphragm 85 in a direction that increases the opening amount of the regulating hole 87. The degree to which the regulating hole 87 opens and the pressure of the hydrogen gas is reduced is determined by the balance of the force of the pressure-reduced hydrogen gas and the force of the ambient air. When the gas pressure on the secondary side is increased by increasing the gas pressure on the primary side, the force applied to the diaphragm by the gas pressure on the secondary side increases. As a result, the force acting to reduce the opening amount of the regulating hole 87 increases, which increases the degree to which the pressure of the hydrogen gas is reduced. In contrast, when the gas pressure on the secondary side is reduced by reducing the gas pressure on the primary side, the force applied to the diaphragm by the gas pressure on the secondary side decreases. As a result, the force that acts to reduce the opening amount of the regulating hole 87 is reduced, thereby decreasing the degree to which the pressure of the hydrogen gas is reduced. In this way, the hydrogen gas pressure on the secondary side that was reduced can be kept substantially constant even if the hydrogen gas pressure on the primary side fluctuates.

When this kind of pressure-reducing valve 162 is used, the structure of the fuel cell system may be such that a pressure reducer can be connected to the back-pressure port 90 which opens to the pressure-regulating chamber 83, and communication between the back-pressure port 90 and the ambient air can be cut off. Then, when the anode pressure reduction control in step S120 shown in FIG. 4 is performed, communication between the pressure-regulating chamber 83 and the ambient air may be cut off and the pressure in the pressure-regulating chamber 83 reduced to less than atmospheric pressure using the pressure reducer. As a result, the force acting to reduce the opening amount of the regulating hole 87 can be increased which increases the degree to which the pressure of the hydrogen gas is reduced, thereby enabling the anode pressure to be reduced.

D8. Eighth Modified Example

In the example embodiment, hydrogen gas stored in the hydrogen tank 23 is used as the fuel gas containing hydrogen. Alternatively, however, a different structure may be used. For example, hydrogen rich reformed gas obtained from an alcohol or hydrocarbon fuel or the like using a reforming reaction such as a steam-reforming reaction may be used as the fuel gas. In this case as well, the same effects can be obtained by ensuring the output voltage, which is achieved by suppressing an increase in the resistance of the electrolyte membrane by performing control to reduce the anode pressure when the moisture content in the electrolyte membrane is low.

The invention claimed is:

1. A fuel cell system, comprising:
a polymer electrolyte fuel cell having a polymer electrolyte membrane;
an anode gas pressure regulating portion;
a determining portion programmed to determine a moisture content in the polymer electrolyte membrane by detecting an output voltage of the fuel cell and comparing the detected output voltage with a reference voltage value, wherein it is determined that the moisture content is low when the detected output voltage is less than said reference voltage value; and
a control portion which controls said anode gas pressure regulating portion, wherein
when it is determined that the moisture content is low, said control portion controls said anode gas pressure regulating portion to set a gas pressure on an anode side of the fuel cell lower than a set value of the gas pressure on the anode side during steady operation at which time the moisture content is not determined as being low.

2. The fuel cell system according to claim 1, wherein when it is determined that the moisture content is low, the control portion controls said anode gas pressure regulating portion to set the gas pressure on the anode side lower than the set value during the steady operation but within a range in which power according to a load requirement on the fuel cell can be generated.

3. The fuel cell system according to claim 1, further comprising:
a hydrogen gas supply passage that supplies hydrogen gas to an anode of the fuel cell; and
an anode off-gas passage that leads gas discharged from the anode of the fuel cell to the hydrogen gas supply passage,
wherein a portion of the hydrogen gas supply passage and the anode off-gas passage form a recirculation flow path that recirculates hydrogen between portions inside the fuel cell, and the control portion controls said anode gas pressure regulating portion to set the pressure inside the recirculation flow path as the gas pressure on the anode side.

4. The fuel cell system according to claim 3, further comprising: an injector which is provided upstream of the recirculation flow path in the hydrogen gas supply passage and which has a discharge port through which the hydrogen gas is discharged to the recirculation flow path side, and a valve that selectively opens and closes the discharge port,
wherein the control portion controls said anode gas pressure regulating portion to set the gas pressure on the anode side by adjusting the open/closed state of the discharge port using the valve.

5. A method for adjusting moisture content in a polymer electrolyte membrane of a polymer electrolyte fuel cell, comprising:
determining a moisture content in the polymer electrolyte membrane by detecting an output voltage of the fuel cell and comparing the detected output voltage with a reference voltage value, wherein it is determined that the moisture content is low when the detected output voltage is less cell than said reference voltage value; and
setting a gas pressure on an anode side of the fuel cell lower than a set value of the gas pressure on the anode side during steady operation at which time the moisture content is not low, when it is determined that the moisture content is low.

* * * * *